March 5, 1974  R. C. SUTTON  3,795,517
BARRIER LAYER FOR LIQUID CRYSTAL-CONTAINING ELEMENTS
Filed Nov. 13, 1972

United States Patent Office 3,795,517
Patented Mar. 5, 1974

3,795,517
BARRIER LAYER FOR LIQUID CRYSTAL-CONTAINING ELEMENTS
Richard C. Sutton, Rochester, N.Y., assignor to Eastman Kodak Company, Rochester, N.Y.
Filed Nov. 13, 1972, Ser. No. 306,232
Int. Cl. G03g 5/00
U.S. Cl. 96—1.5
9 Claims

ABSTRACT OF THE DISCLOSURE

An improved barrier layer containing a polymerized blend of at least 50 mole percent of one or more $\alpha,\beta$-ethylenically unsaturated amides, 0 to 50 mole percent of an $\alpha,\beta$-ethylenically unsaturated sulfo ester, and 0 to 10 mole percent of a crosslinkable monomer is disclosed for use in an electro-optical element containing a photoconductive layer, a liquid crystal film, and the barrier layer sandwiched therebetween.

BACKGROUND OF THE INVENTION

Field of the invention

This invention relates to reproduction elements and systems using such elements which employ juxtaposed layers of photoconductive materials and liquid crystalline materials and, in particular, to an improved barrier layer composition which may be used in these elements to extend their useful lifetime.

Description of the prior art

As described in U.S. Pat. 3,592,527, issued July 13, 1971, it has been found that useful visual display devices can be produced which contain as the visual image forming element thereof a multilayer structure composed of a layer or film of a liquid crystalline material overlying a layer of a photoconductive composition.

The image-forming capability of the above-described liquid crystal photoconductive unit is, of course, due to the electro-optical properties of such a unit. The photoconductive properties of conventional photoconductive materials and layers containing the same are well known, having been described in numerous patents, literature references, and texts, for example, Schaffert, "Electrophotography," published by Focal Press Ltd., 1965.

The electro-optical properties of liquid crystalline material, although described in various literature references, are pehaps not so well known. Briefly, toward the end of the 19th century F. Reinitzer and O. Lehmann independently observed that certain substances in passing from a solid crystalline state to an isotropic liquid state passed through a state or condition over a given temperature range wherein they display rheological properties similar to that of fluids, but have optical properties similar to that of the crystalline state. In order to identify these properties, Lehmann used the term "liquid crystal" which terminology persists today. Present thinking tends to regard substances which exhibit these properties as being in a fourth state of matter known as the mesomorphic state or mesophase since it is a state or phase intermediate that of the anisotropic crystal and that of the isotropic liquid.

There are three distinct mesophoric states or forms, namely, the smectic mesophase, the nematic mesophase, and the cholesteric mesophase. A nematic liquid crystal is essentially transparent, and therefore transmits light. But when placed in a D.C. electrical field, the molecules of some of these nematic liquid crystals become disoriented so that the material diffuses light and becomes milky white in appearance. When the D.C. electric field is removed, the molecules of the nematic liquid crystal return to their previous orientation so that the liquid crystal is again transparent. This phenomena is discussed in Proceedings of the I.E.E.E., for July 1968 in an article entitled: "Dynamic Scattering: A New Electro-Optical Effect in Certain Classes of Nematic Liquid Crystals," by Heilmeier, Zanoni and Barton at pp. 1162–1171.

The reflective optical storage effect of mixtures of cholesteric and nematic liquid crystal materials is discussed in a paper appearing in Applied Physics Letters for Aug. 15, 1968 in an article entitled, "A New Electric Field Controlled Reflective Optical Storage Effect in Mixed-Liquid Crystal Systems," by Heilmeier and Goldmacher at pp. 132 and 133, in which the authors describe how a mixture of nematic and cholesteric mesomorphic materials exhibit optical storage properties under a D.C. or low frequency A.C. electric field, which changes the initially transparent material to a milky white light-diffusing material. The liquid crystal material remains in the light-diffusing state upon removal of the electric field. The mixture can be readily raised or changed back to a transparent state by the application of a high frequency A.C. signal greater than 700 Hz.

An investigation of the electro-optical properties of a multilayer structure containing both photoconductive and liquid crystal materials, has lead to the finding that a visual image may be formed by projecting a light image upon an element having such a multilayer structure interposed between two transparent electrodes as a voltage pulse is applied across the electrodes. That is, the light image impinging on the photoconductive layer as the voltage pulse is applied across the element causes the exposed areas of the photoconductive layer to become more conductive than the unexposed areas, which, in turn, causes imagewise dynamic scattering in the areas of the liquid crystal material corresponding to the conductive portions of the photoconductive layer.

Although a photoconductor-liquid crystal unit has been found useful in various electro-optical devices such as viewing screens, display devices, etc. one problem which has limited the use of such elements in various display devices is the fact that many, if not most, useful photoconductive materials are subject to chemical attack by an adjacent layer of liquid crystal material. Typically, for example, an organic photoconductive film overcoated with a thin film or layer of a liquid crystal material will be rendered substantially useless by the chemical action of the liquid crystal material on the photoconductive substance within a few hours. In the past, various polymeric layers have been interposed between the photoconductive layer and the liquid crystal layer to prevent chemical attack by the liquid crystal material. However, relatively few polymeric layers have been found successful. Typically, this is because the barrier layer is not sufficiently impermeable to the liquid crystalline material to prevent chemical attack of a photoconductive layer by a liquid crystalline material. However, the barrier layer must not only be impermeable to the liquid crystal material, but in addition, it must have proper electrical characteristics so as not to interfere with the electrical properties of the photoconductive-liquid crystal unit. Illustrative of various barrier layer materials which have been tried in the past are cellulose nitrate barrier layer materials as described in Morse, U.S. patent application Ser. No. 81,959, filed Oct. 19, 1970, now U.S. Pat. 3,722,998, and entitled "Method and Apparatus for Constrast Reducing."

Other materials have been interposed between a liquid crystal layer and a photoconductive material in various types of electro-optical imaging processes and devices other than those discussed above. For example, British Pat. 1,235,552, dated June 16, 1971 at p. 3 thereof describes the use of an insulating polymeric material interposed between a liquid crystal material and a photoconductive layer. These insulating polymeric materials include cellulose acetates, polyurethanes, polyolefins, polyesters, polystyrene, polycarbonates, and preferably polyvinyl fluoride. However, insulating polymeric materials such as those noted immediately hereinbefore are unsatisfactory as a barrier layer in an imaging process or device as described in U.S. Ser. No. 81,959 (noted previously) because of their extremely high resistivity. That is, these materials are so insulating that they interfere with the electrical properties of the photoconductive-liquid crystalline element in such processes and devices. In addition, it has been found that when materials such as polyurethanes, cellulose acetates, polystyrene, and polyvinyl acetate as well as many of the other above-noted polymeric materials are interposed between a photoconductive layer and a liquid crystalline layer, the resultant element remains in effective operating condition for only relatively short periods of time due to chemical decay. That is, these materials are subject to being dissolved by or being crystallized by typical liquid crystal compositions. Such chemical decay, of course, results in the degradation of the barrier layer thereby leading to attack of the photoconductive layer by the liquid crystal composition; and, also the liquid crystal composition may become contaminated and no longer scatter light effectively when the photoconductive-liquid crystal element is activated.

SUMMARY OF THE INVENTION

In accord with the present invention, there is provided an electro-optical element comprised of a film of a liquid crystal composition, a layer of a photoconductive insulating composition, and an improved polymeric barrier layer interposed between said liquid crystal composition and said photoconductive composition. The polymeric barrier layer used in the present invention comprises a polymerized blend of at least 50 mole percent of one or more $\alpha,\beta$-ethylenically unsaturated amides, 0 to 50 mole percent of an $\alpha,\beta$-ethylenically unsaturated sulfo ester, and 0 to 10 mole percent of a cross-linkable monomer. The polymeric barrier layer materials utilized in the present invention have the special advantage that the physical and especially electrical properties thereof may be readily varied and controlled. For example, the electrical conductivity of these polymers can be controlled by varying the amount of $\alpha,\beta$-ethylenically unsaturated sulfo ester incorporated in the polymer. Moreover, the hardness and solubility properties of the polymer, as well as other physical properties, can be controlled by varying the amount of the various repeating units of the polymer, especially the amount of the cross-linkable monomer. The polymeric barrier materials of the present invention have been found especially effective because of their ability to withstand solvent and chemical attack by the liquid crystal material and because of their relative impermeability to a liquid crystal composition.

Various additional advantages of the present invention will be apparent from the description which follows.

DESCRIPTION OF THE PREFERRED EMBODIMENTS

Figure 1:
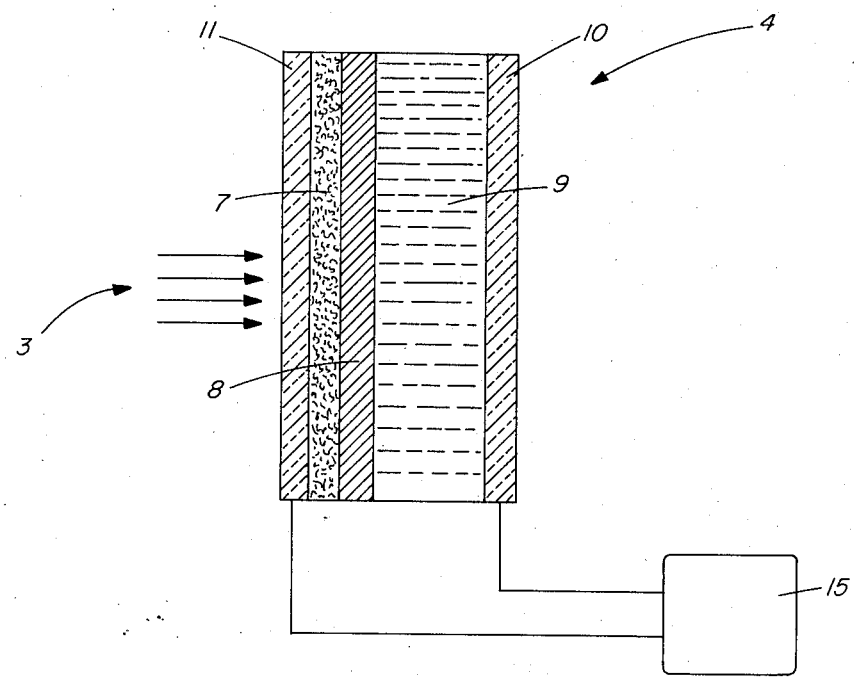
FIG. 1 is a schematic sectional view of an electro-optical element of the invention.

As stated hereinabove, the barrier layer utilized in the present invention comprises a polymerized blend, one of the components of the blend being an $\alpha,\beta$-ethylenically unsaturated amide.

Typical of the $\alpha,\beta$-ethylenically unsaturated amides useful in the invention are materials having the following formula (I) 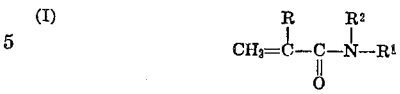

wherein R represents hydrogen or a methyl radical and $R^1$ and $R^2$, which may be the same or different, represent hydrogen, an aryl radical such as a phenyl radical or a naphthyl radical, a lower alkyl or alkenyl radical having 1 to about 6 carbon atoms, including substituted aryl, alkyl and alkenyl radicals. Typical substituent groups which may be attached to the aforementioned aryl, alkyl and alkenyl radicals are groups such as —$SO_3M$ wherein M represents hydrogen, a metal, preferably an alkali metal or alkaline earth metal, or an ammonium cation; a hydroxy radical; an alkoxy radical having 1 to about 4 carbon atoms; and —COOM wherein M represents hydrogen, a metal, preferably an alkali metal or alkaline earth metal, or an ammonium cation. A partial listing of useful amides as represented by Formula I above includes acrylamide, methacrylamide, 2-acrylamido-2-methylpropanesulfonic acid, i.e.,

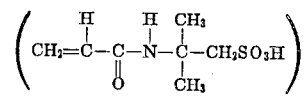

N - isopropylacrylamide, N,N-dimethylacrylamide, N-(1-naphthyl)acrylamide, 2 - acrylamido - 2-methylpropionic acid, N - phenylmethacrylamide, N,N - dialkylmethacrylamide, and the like. Preferred amides for use in the present invention, based on their physical and chemical properties, as well as their ready availability, include acrylamide and methacrylamide.

Alkaline earth metals are defined herein to include beryllium, magnesium, calcium, strontium, barium, and radium. Alkali metals are defined herein to include lithium, sodium, potassium, rubidium and cesium.

Ammonium cations are defined herein to include cations having the following formula: $N(R^8)_4$ wherein $R^8$ represents hydrogen, a lower alkyl or alkenyl radical having 1 to about 6 carbon atoms, and an aryl radical such as a phenyl or naphthyl radical.

In one embodiment of the present invention, the polymerized blend of the barrier layer consists essentially of a polymerized blend of one or more of the above-described $\alpha,\beta$-ethylenically unsaturated amides.

In accord with those embodiments of the present invention wherein the barrier layer comprises a polymerized blend including 0 to 50 mole percent of an $\alpha,\beta$-ethylenically unsaturated sulfo ester as well as one or more of the above-described $\alpha,\beta$-ethylenically unsaturated amides, the $\alpha,\beta$-ethylenically unsaturated sulfo ester is typically selected from those sulfo esters having the formula (II)  $R^3—CO_2—R^4—SO_3M$ wherein the radical $R^3$ represents a vinyl or $\alpha$-substituted vinyl radical wherein the $\alpha$-substituent is hydrogen, a halogen, such as chlorine or bromine, or an alkyl radical having 1 to about 6 carbon atoms; the radical $R^4$ represents a divalent organic radical such as a phenylene radical or an alkylene radical having from 1 to about 10 carbon atoms including substituted phenylene and alkylene radicals having substituents such as alkyl, alkoxy, halogens, or phenyl groups, alkylene radicals having the formula

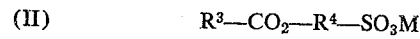

wherein $n$ is an integer of 1 to 4 have been found especially effective; and M represents a hydrogen atom, an ammonium cation, or a metal, preferably an alkali metal or an alkaline earth metal. As will be apparent from the above structural formula the term "sulfo" is utilized in the present specification to include the sulfonic acid moiety —SO₃H or the salts thereof such as —SO₃Na. A partial listing of typical sulfo esters useful in the present invention corresponding to Formula II hereinabove includes the following sulfo esters (as well as the salts thereof):

2-sulfoethyl acrylate
2-sulfoethyl methacrylate
2-sulfoethyl α-ethylacrylate
2-sulfoethyl α-propylacrylate
2-sulfoethyl α-butylacrylate
2-sulfoethyl α-hexylacrylate
2-sulfoethyl α-cyclohexylacrylate
2-sulfoethyl α-chloroacrylate
2-sulfo-1-propyl acrylate
2-sulfo-1-propyl methacrylate
1-sulfo-2-propyl acrylate and methacrrylate
2-sulfo-1-butyl acrylate and methacrylate
1-sulfo-2-butyl acrylate and methacrylate
3-sulfo-2-butyl acrylate and methacrylate
2-methyl-2-sulfo-1-propyl acrylate and methacrylate
2-methyl-1-sulfo-2-propyl acrylate and methacrylate
3-bromo-2-sulfo-1-propyl acrylate
Sulfophenyl acrylate and methacrylate
3-methoxy-2-sulfo-1-propyl acrylate
3-methoxy-1-sulfo-2-propyl acrylate
2-sulfocyclohexyl acrylate
2-phenyl-2-sulfoethyl acrylate
1-phenyl-2-sulfoethyl acrylate
3-sulfo-1-propyl acrylate
3-sulfo-1-butyl acrylate
4-sulfo-1-butyl acrylate.

The above-described α,β-ethylenically unsaturated sulfo esters may be prepared by methods which are well known. Accordingly, extended description of such method is deemed unnecessary in the present application. However, if desired, further information relating to processes for preparing these materials can be obtained by reference to U.S. Pat. 3,024,221, issued Mar. 6, 1962 and incorporated herein by reference thereto.

As indicated hereinabove, in accord with certain embodiments of the present invention, the polymerized blend of the barrier layer utilized may contain from 0 to about 10 mole percent of a cross-linkable monomer. Particularly useful such cross-linkable monomers include those prepared from acrylic type esters having attached thereto active methylene groups in the ester moiety or in a substituent alpha to the carbonyl group. Such useful cross-linkable monomers can be represented by the following formula:

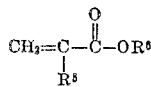

where R⁵ represents hydrogen; alkyl, desirably containing up to about 10 carbon atoms, as exemplified by methyl, propyl, isobutyl, octyl, decyl, and the like; and

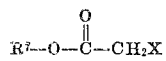

where R⁷ represents an alkylene having up to about 4 carbon atoms and X represents an aliphatic acyl or cyano; and where R⁶ represents (a) a group having up to about 10 carbon atoms such as alkyl, cycloalkyl, or aryl; and (b)

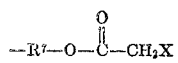

where R⁷ and X are as defined, provided that one and only one R⁵ and R⁶ is always

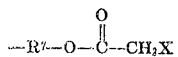

A partial listing of typical examples of the above-described acrylic type esters containing an active methylene group include the following compounds: 2-acetoacetoxyethyl methacrylate, 2-acetoacetoxyethyl acrylate, ethyl α-acetoacetoxymethylacrylate, and 2-cyanoacetoxyethyl methacrylate.

The above-described acrylic type esters containing an active methylene group may be prepared by known chemical procedures and therefore an extended description thereof is deemed unnecessary. For further information, if desired, respecting these materials and methods of their preparation, reference may be made to U.S. Pat. 3,459,790, issued Aug. 5, 1969 and included herein by reference thereto.

As stated hereinabove, in accord with the various embodiments of the present invention, the polymerized blend of the barrier layer materials utilized herein may be homopolymers or copolymers consisting essentially of the above-described α,β-ethylenically unsaturated amides, or copolymers comprising a polymerized blend of the aforementioned amides together with the above-described α,β-ethylenically unsaturated sulfo esters, or copolymers comprising a polymerized blend of the aforementioned amides and sulfo esters together with the above-described cross-linkable monomers. Preferably, when utilizing barrier layers containing the above-described cross-linkable monomers, the amount of cross-linkable monomers utilized in the polymerization of these barrier layer materials is relatively small, typically less than 10 mole percent of the initial reactants to be polymerized. By utilizing amounts of the cross-linkable monomer approaching 10 mole percent of the initial blend of constituents to be polymerized, one obtains a resultant copolymeric barrier layer which exhibits increased hardness and somewhat decreased solubility in organic solvents. Thus, the hardness and solubility properties of the resultant barrier layer can be influenced and, to an extent, predetermined and selected simply by varying the amount of the cross-linkable monomer. Similarly, the electrical conductivity of the resultant barrier layer can be influenced by varying the amount of the above-described sulfo ester utilized in preparing the polymeric barrier layer materials of the present invention. In general, as the amount of the sulfo ester component of the resultant polymer is increased, the conductivity of the resultant polymer is increased.

The polymerization process utilized to prepare the polymers forming the barrier layer materials of the present invention include various polymerization techniques well known in the polymer art. Preferably, the polymers of the invention are prepared by solution polymerization techniques utilizing an aqueous solution containing approximately 10 percent by weight concentration of reactants and employing temperatures ranging from about 60 to about 95° C. for at least 2 hours. Typically, from about 0.1 to 1 percent by weight of the reactants used in the polymerization contains a redox or free radical catalyst such as potassium persulfate admixed with sodium metabisulfite or hydrogen peroxide. A typical solution polymerization technique for forming polymers useful in the present invention is set forth in the examples presented hereinafter.

The electrical resistivity properties of the barrier layer compositions of the present invention are important. That is, it has been found that an effective barrier layer interposed between a photoconductive insulating layer and a liquid crystal film advantageously possesses an electrical resistivity intermediate between that of the resistivity of the liquid crystalline film and the dark resistivity of the photoconductive composition. For example, for a typical photoconductive-liquid crystal electro-optical element of the type described in Morse, U.S. Ser. No. 81,959 referred to hereinabove, it has been found that conventional liquid crystal materials generally possess an electrical resistivity within the range of from about 10⁸ to about 10¹⁰ ohm-cm. and conventional photoconductive insulating materials typically exhibit a resistivity greater than about 10¹⁵ ohm-cm. Accordingly, a useful barrier layer for such an electro-optical element should advantageously possess a resistivity within the range of from greater than about $10^{10}$ to less than about $10^{15}$ ohm-cm. It will be appreciated that the aforementioned resistivity ranges are merely exemplary and may vary somewhat depending on the particular photoconductive insulating material and liquid crystal film. The point to be recognized here is simply that the barrier layer composition preferably has a resistivity intermediate between that of the liquid crystal film and the photoconductive insulating composition.

Although useful barrier layers in accord with the present invention may exhibit a resistivity somewhat outside the preferred range noted above, i.e., intermediate between the resistivity of the liquid crystalline film and the photoconductive insulating layer, it has been found that if the electrical resistivity of the barrier layer is substantially higher than that specified in the above range, the resultant electro-optical element containing such a barrier layer exhibits very poor electrical response, i.e., it is difficult to obtain a good visual image in the liquid crystalline film unless unusually large electrical potentials are applied to the electro-optical element. On the other hand, if the electrical resistivity of the barrier layer is substantially lower than that specified in the above range, the liquid crystal film of the resultant electro-optical element exhibits a fuzzy or unsharp visual image due to non-imagewise dynamic scattering of the liquid crystal film. Such non-imagewise dynamic scatter in the liquid crystal film is caused by the low resistivity of the barrier layer which leads to lateral conductivity within the barrier layer.

The term electrical resistivity as utilized herein is defined as the specific resistivity $(\rho)$ of a material as measured at 23° C.

The thickness of the barrier layers utilized in the present invention typically vary within the range of from about 0.5 to about 6 microns. However, layers having a thickness outside the above range may also be used.

The barrier layers utilized in the invention may be applied as an overcoat to a photoconductive insulating layer, and then, in turn, overcoated with a liquid crystal film to provide the electro-optical element of the invention. In addition, if desired, various thin subbing layers serving as adhesion promoting layers may be disposed between the photoconductive layer and the barrier layers. Typically, subbing layers are on the order of about 1 micron thick or less and comprise a polymeric composition such as a blend of poly(acrylic acid) and poly(vinyl acetate). However, as noted above, such subbing layers are optional. The subbing layers are not good barrier layers by themselves because of their inability to withstand solvent attack by conventional liquid crystal materials.

The application of the barrier layer to the photoconductive layer utilized in the present invention may be effected by a variety of techniques including solvent coating such as dip coating, spray coating and the like; various lamination techniques; dispersion coating techniques, etc. Generally, it has been found that useful barrier layers may be provided by coating a solvent solution of the barrier layer composition onto the surface of a photoconductive layer or subbing layer and drying the resultant wet coating to form a film of the barrier layer composition. Typical solvents which may be used include organic solvents such as various alcohols, for example; methanol, ethanol, etc., and inorganic solvents such as water and mixtures of organic and inorganic solvents, such as aqueous-alcohol solvents.

The liquid crystal film utilized in the present invention may be selected from a variety of useful liquid crystal compositions. If a nematic liquid crystal composition is used the resultant electro-optical element containing the same will provide a visual image display only so long as an electric field is applied and is erased when the electric field is removed. Whereas, if a mixture of nematic and cholesteric liquid crystal materials are utilized, the resultant electro-optical element containing the same will provide a visual image display upon application of an electric field and the image display will remain visible for a period of time after removal of the electric field.

A variety of liquid crystal materials are known in the art and accordingly extensive discussion thereof is unnecessary. For further detail, a partial listing of various suitable liquid crystal material may be found at pp. 11–13 of Molecular Structure and the Properties of Liquid Crystals by G. W. Grey (1962), hereby incorporated herein by reference thereto. Illustrative of various suitable nematic mesophase liquid crystal materials which have been found especially useful in the present invention include N-(p-methoxybenzylidene)-p-butylaniline; mixtures of butyl p-(p-ethoxyphenoxycarbonyl)phenyl carbonate and p-[N-(p-methoxybenzylidene)amino]phenyl acetate; mixtures of p-[(p-methoxybenzylidene)amino] phenyl acetate.

Illustrative of various suitable mixtures of nematic mesophase and cholesteric mesophase materials are mixtures containing about 90% by weight of N-(p-methoxybenzylidene)-p-butylaniline and about 10% by weight cholesteryl oleyl carbonate; mixtures containing about 65% by weight of p-pentoxycarbonyloxy-N-(p-valeryloxybenzylidene)aniline, about 30 weight percent N-(p-acetoxybenzylidene)-p-methoxycarbonyloxyaniline, and about 5 weight percent of cholesteryl 2-ethylhexanoate.

Various other liquid crystal compositions useful in the present invention are described in the following U.S. patent applications and are included herein by reference thereto: Bucher, "Liquid Crystal Composition," U.S. Ser. No. 218,243, filed Jan. 17, 1972, now abandoned; Van Meter and Klanderman, "Liquid Crystal Compositions I," U.S. Ser. No. 247,564, filed Apr. 26, 1972, now abandoned; Van Meter and Klanderman, "Liquid Crystal Compositions II," U.S. Ser. No. 247,563, filed Apr. 26, 1972; and Klanderman and Criswell, "Liquid Crystalline Compositions and Method," U.S. Ser. No. 268,265, filed July 3, 1972, now abandoned.

The liquid crystal film composition utilized in the present invention typically has a film thickness on the order of about 2 to about 250 microns. The liquid crystal film, as indicated hereinbefore, overlies the barrier layer in the photoconductive-liquid crystal electro-optical element of the invention. In a conventional electro-optical cell wherein the photoconductive-barrier layer-liquid crystal layers are sandwiched between two parallel transparent electrodes, the liquid crystal film is typically supported by capillary action between the barrier layer and the interior face of the adjacent transparent electrode.

The photoconductive insulating layer used in the present invention may generally be composed of any of the insulating photoconductive layers utilized in electrophotography. Typically these layers have a dry thickness on the order of from about 1 to about 500 microns, preferably 1 to about 50 microns.

Thus, for example, the photoconductors can be inorganic, organic (including both polymeric and non-polymeric types), or organo-metallic compounds. Useful inorganic photoconductors include zinc oxide, zinc sulfide, titanium dioxide, cadmium sulfide, cadmium selenide, lead oxide, and the like. Useful organo-metallic photoconductors include derivatives of Group IIIa, IVa and Va metals having at least one aminoaryl group attached to the metal atom. Among the various organic photoconductors which may be used the arylamines such as described in U.S. 3,240,597, issued Mar. 15, 1966, Klupfel et al. U.S. Pat. No. 3,180,730, issued Apr. 27, 1965, and Brantly et al. U.S. 3,567,450, issued Mar. 2, 1971; polyarylalkanes described in Noe et al. U.S. 3,274,000, issued Sept. 20, 1966, Wilson, U.S. 3,542,547, issued Nov. 24, 1970, and Seus, et al. U.S. 3,542,544, issued Nov. 24, 1970; as well as any of the photoconductors disclosed in Contois and Merrill Belgian Pat. No. 748,511, dated June 15, 1970, are especially preferred. A wide variety of polymeric resins are known for use as binders in the photoconductive layers employing organic photoconductors; examples of such binders include silicone resins, acrylic resins, polycarbonate resins, polyester resins, phenolic resins, and mixtures thereof. Similarly, polymeric photoconductors such as a poly(vinyl carbazole) and halogenated poly(vinyl carbazole) can also be used. As is well known in the art, various photosensitizing agents can also be incorporated in the photoconductive layer to effect a change in the sensitivity or speed of the system or a change in its spectral response characteristics. Examples of particularly effective photosensitizing agents include the pyrylium dyes, such as pyrylium and thiapyrylium dye salts described in U.S. Pat. 3,250,615, issued May 10, 1966 and U.S. 3,615,414, issued Oct. 26, 1971. Organic photoconductive compositions especially useful in the invention are those including a co-crystalline complex of a poly(carbonate) resin and a pyrylium dye as described in U.S. 3,615,414, issued Oct. 26, 1971, and U.S. 3,679,407, issued July 25, 1972.

The choice of a particular photoconductive composition will depend, in part, on whether the resultant electro-optical element is to be used in the "reflection mode" or "transmission mode" as explained hereinafter. As will be apparent from the following description, if the element is to be used in the "transmission mode" a transparent photo-conductive layer and barrier layer are used. On the other hand, if the element is used in the reflection mode, the photoconductive layer may be transparent or opaque.

If the electro-optical element is to be used in the reflection mode the barrier layer preferably contains a suitable amount of colorant material such as a dye or pigment, for example, a nigrosine dye, so that light impinging on the barrier layer through the liquid crystal film is absorbed or reflected, rather than transmitted through the barrier layer to the photoconductive layer.

The transparent electrodes utilized in the present invention as a means for applying an electric field to the electro-optical element of the invention may be prepared from a wide variety of materials. For example, a conductive glass such as NESA glass may be utilized; or a transparent conductive stripe such as a thin layer of indium oxide or other similar material may be coated on the inner surface of a transparent material such as a glass plate or a transparent sheet or plate of a material or synthetic resin.

As indicated hereinabove, the electro-optical element of the present invention may be utilized in a suitable electro-optical cell either in a transmission mode or reflection mode of operation. Briefly, these various modes of operation will be illustrated with reference to FIG. 1. For example, when utilized in a transmission mode of operation, an electro-optical element of the present invention comprised of photoconductive layer 7, barrier layer 8, and liquid crystal film 9 is sandwiched between a pair of transparent electrodes 10 and 11. A voltage source 15 is connected to electrodes 10 and 11. For the sake of the present illustration, it will be assumed that electro-optical device 4 contains a liquid crystal material comprised of a mixture of a nematic mesophase and cholesteric mesophase material so that the device exhibits image storage capabilities. An image may be produced in such an electro-optical device by applying a D.C. or low frequency A.C. signal across electrodes 10 and 11 and either simultaneously therewith or subsequent thereto while maintaining the applied potential, exposing photoconductive layer 7 to an electromagnetic radiation pattern 3. The electromagnetic radiation utilized is, of course, radiation to which the photoconductive layer is sensitive. As a result, a conductivity pattern will be established in photoconductive layer 7 which, in turn, will cause an imagewise current flow through device 4 corresponding to the conductivity pattern established in photoconductive layer 7. The imagewise current flow causes dynamic scattering in liquid crystal film 9 causing the liquid crystal material to be converted from a substantially transparent state to a milky or diffuse appearance. The dynamic scatter set up in the liquid crystal film will have a varying intensity in accord with the imagewise current flow set up in the device 4. Having established imagewise scattering in the liquid crystal material, the applied potential may be removed. Since the element under consideration contains a liquid crystal material exhibiting optical storage properties, the imagewise scattering pattern set up in the liquid crystal material will remain in the liquid crystal film even after the potential is removed. Once the potential is removed, of course, device 4 becomes insensitive to electromagnetic radiation. Thus, the element may now be used in a transmission mode by projecting visible light through device 4. Since each of the layers of the element of device 4 must be at least to some extent transparent if the element is to be used in a transmission mode, an observer viewing liquid crystal layer 9 of the device will see visible light being transmitted through the device in accord with the image pattern established in liquid crystalline layer 9. In general, the visible image pattern seen by the observer may be thought of as a negative contrast image of the original image pattern.

If an electrical-optical element of the present invention is utilized in a device such as illustrated in FIG. 1 and operated in a reflection mode, an image pattern will be produced in liquid crystal layer 9 essentially as described hereinabove wherein the element was operated in a transmission mode. However, in the reflection mode of operation, barrier layer 8 rather than being a transparent material will be substantially opaque or otherwise incapable of transmitting visible light. Moreover, when device 4 is operated in the reflection mode, photoconductive layer 7 need not be transparent to visible light radiation. Accordingly, in the reflection mode of operation, after an imagewise dynamic scatter pattern has been established in liquid crystal layer 9, the potential applied to the device may be removed. The element with the stored image pattern contained in layer 9 will then be subjected to a uniform exposure of visible light from the front through transparent electrode 10. The visible light thus projected through layer 10 will be transmitted through the liquid crystal layer 9 in accordance with the image pattern established in this layer. In those areas of layer 9 which remain substantially transparent, i.e., those areas of layer 9 where the liquid crystal material has not been placed into a scattering mode, visible light will be transmitted, and an observer looking at layer 9 will see in these areas the surface of the opaque barrier layer 8. In those areas of layer 9 wherein the liquid crystal material has been placed in a scattering mode, visible light impinging thereon will be scattered back to the observer who will see these areas as essentially white or grey areas depending upon the degree of scattering therein. Generally, in a reflection mode of operation, an observer viewing liquid crystal layer 9 will see what may be thought of as a contrast positive image of the original image pattern projected onto device 4.

The practice of the invention will be further evidenced by the examples listed below, which are designed to be illustrative rather than offering limitations in scope.

EXAMPLE 1

A 10 micron thick (dry thickness) photoconductive layer is prepared composed of polycarbonate resin, 4,4′-diethylamino - 2,2′ - dimethyltriphenylmethane organic photoconductor and a thiapyrylium sensitizing dye. The support for the layer is 4-mil poly(ethylene terephthalate), which is vacuum deposited with nickel to provide a conducting support. The resultant organic photoconductive film is used in each of the examples.

A control barrier layer (5 microns dry thickness) of cellulose nitrate is coated over the above-described organic photoconductor film. The coating solution consists of the following:

| | G. |
|---|---|
| Parlodion (trademark of Mallinckrodt Chemical Works for cellulose nitrate) | 120 |
| Methanol | 1320 |
| n-Butanol | 560 |
| 2-methoxyethanol | 100 |

This barrier layer is similar to that disclosed in Morse, U.S. application Ser. No. 81,959, differing only in thickness of the layer. A liquid crystalline film is then coated on the surface of the cellulose nitrate barrier layer. The composition of the liquid crystal film is set forth hereinafter.

The resultant element is tested for both shelf life stability and imaging capabilities. Details and tabulated results follow the examples. Shelf life stability is good. However, the resultant scattered light images are of low quality and a display cell containing the photoconductor-barrier layer-liquid crystal element of this example exhibits poor electrical response (i.e., undesirably high voltage pulses and long pulse times are required for image formation).

EXAMPLE 2

A photoconductor-barrier layer-liquid crystal containing element similar to Example 1 is prepared, except that the control cellulose nitrate barrier layer is 3 microns thick. The element has good shelf stability and produces good images, but exhibits poor electrical response.

EXAMPLE 3

A photoconductor-barrier layer-liquid crystal containing element is prepared similar to Example 1, except that the control cellulose nitrate barrier is 1.5 microns thick. This element has good shelf stability, and produces good quality images but does not exhibit good electrical response.

EXAMPLE 4

Adhesion promoting layer

A separate adhesion promoting subbing layer consisting of 60% poly(acrylic acid) and 40% poly(vinyl acetate) is coated on the organic photoconductor film described in Example 1 at 0.025 g./ft.$^2$ from a 3% methanol solution. The resultant adhesion promoting layer has a dry thickness of about 0.2 micron. This serves as a base layer for the examples that follow. The adhesion promoting layer is optional and is not a good barrier layer itself because of its liquid crystal solvating properties.

EXAMPLE 5

Preparation of poly(acrylamide - co - 3 - methacryloyloxypropane - 1 - sulfonic acid, sodium salt - co - 2 - acetoacetoxyethyl methacrylate) (weight ratio 90.25:4.75:5)

A 500 ml. flask is charged with 204 ml. of water, 22.5 g. of acrylamide, 1.19 g. of 3-methacryloyloxypropane-1-sulfonic acid, sodium salt, and 22.5 g. of absolute ethanol containing 1.25 g. of 2-acetoacetoxyethyl methacrylate, and the mixture is sparged with nitrogen for 20 minutes. The flask is immersed in a 60° C. thermo-stated water bath. When the contents of the flask reach 60° C., 0.06 g. of 2,2'-azobis(2-methylpropionitrile) dissolved in 2 ml. of acetone is added and the mixture is stirred under a nitrogen atmosphere for 16 hours. The bulk viscosity of the reaction mixture (25° C.) at 11.1% solids content is 1550 cps.

Another batch prepared by the same procedure but on a larger (5 gal. capacity) scale contained 11.8% solids and had a bulk viscosity of 3300 cps. A sample of the large-scale batch was isolated by pouring 500 ml. of the reaction mixture into 3 liters of isopropyl alcohol, collecting the precipitated polymer by filtration, washing with isopropyl alcohol, then with diethyl ether, and drying. The dry sample had a $T_g$ of 184° C. and an inherent viscosity of 1.51 measured at a concentration of 0.25 g./deciliter in 1.0 N NaCl solution at 25° C.

A coating of the polymer described immediately above is applied to the composite film structure (photoconductor plus adhesive layer) described in Example 4. The resultant coating is about 3 microns thick (dry thickness). A liquid crystal film is then coated on the surface of the above-described polymer to form a photoconductor-barrier layer-liquid crystal element of the present invention. The resultant element has good shelf stability and exhibits excellent imaging quality and electrical response characteristics. See Tables I and II.

EXAMPLE 6

Preparation of poly(acrylamide-co - 3 - methacryloyloxypropane - 1 - sulfonic acid, sodium salt) (weight ratio 80:20)

A 5-gallon reactor is charged with 12.8 kg. of water, 1440 g. of ethanol, 1280 g. of acrylamide, and 320 g. of 3-methacryloyloxypropane - 1 - sulfonic acid, sodium salt and the mixture is sparged with nitrogen gas for 20 minutes while the temperature is brought up to 60° C. When the contents of the reactor reaches 60° C., 25.6 ml. of 30% hydrogen peroxide solution is added and the mixture is stirred under a nitrogen atmosphere for 16 hours. Upon cooling (25° C.) the reaction mixture has a bulk viscosity of 4650 cps. and a solids content of 11.1 percent. A sample isolated as in Example 1 has a $T_g$ of 84° C. and an inherent viscosity in 1.0 N NaCl (measured as in Example 5) of 1.75.

A coating of the polymer described immediately above is applied to the composite film structure (photoconductor plus adhesive layer) described in Example 6. The resultant coating is about 3 microns thick (dry thickness). A liquid crystalline film is coated on the surface of the above-described polymer to form a photoconductor-barrier layer-liquid crystal element of the present invention. The resultant element has good shelf stability and exhibits excellent imaging quality and electrical response characteristics. See Tables I and II.

Shelf life tests

The evaluation for chemical stability (shelf life-time) for Examples 1–3 and 5–6 consists of maintaining the photoconductor-barrier layer structure in direct contact with the liquid crystal material at room temperature (23° C.) for a specified period. At the termination of this period, the samples are visually examined for chemically caused defects. To eliminate environmental contamination, the samples are protected with microscope slide cover glass. The barrier layer-containing elements of Examples 1–3 and 5–6 are tested for chemical stability using two different liquid crystal films. Data is given in Table I for the following liquid-crystal storage mixtures:

Storage mix I—comprises 90% by weight N-(p-methoxybenzylidene) - p - butylaniline and 10% by weight cholesteryl oleyl carbonate;

Storage mix II—comprises an interconverted mixture of 66.6 mole percent N - (p - valeryloxybenzylidene)-p-pentyloxycarbonyloxyaniline and 33.3 mole percent N-(p - acetoxybenzylidene) - p - methoxycarbonyloxyaniline, and small amounts of a cholesteryl ester and a quaternary salt comprising a quinolinium system with a long alkyl chain on the nitrogen.

The above-described interconverted liquid crystal compositions are more particularly described in the Klanderman and Criswell patent application, U.S. Ser. No. 268,265, filed July 3, 1972, referred to hereinbefore.

In general, the shelf lifetimes are greatly extended by the use of storage mix II, whereas with storage mix I only the thickest cellulose nitrate barrier coat has an appreciable lifetime. The results of the above-described shelf lifetime test are shown for Examples 1–3 and 5–6 in Table I.

In addition, the shelf lifetime test of Ex. 5 and 6 shown in Table I for storage mixture II is continued beyond 90 days for a total of 171 days. No visible damage to the photoconductor element coated with the barrier layer of Ex. 5 and 6 is observed.

TABLE I.—SHELF LIFETIME TEST RESULTS

| Example | Storage mix I | | Storage mix II | |
|---|---|---|---|---|
| | Test duration | Rating[1] | Test duration | Rating[1] |
| 1 (control) | 33 days | A | 90 days | A |
| 2 (control) | do | B | do | A |
| 3 (control) | do | C | do | A |
| 5 | 14 days | B | 90 days | A |
| 6 | do | B | do | A |
| Organic photoconductive film with liquid crystal film and no barrier layer (control) | 1 day | C | 60 days | B |

[1] Rating code:
A = Zero defects,
B = Minor damage,
C = Total destruction.

Image and electrical response tests

The imaging capabilities of the materials described in Examples 1–3, 5 and 6 are evaluated in a display device comprising a liquid crystal storage mixture sandwiched between conducting glass and the barrier-coated organic photoconductor elements of Examples 1–3, 5 and 6. With a voltage pulse applied across the structure, photocurrent causes imagewise dynamic scatter in the liquid crystal storage mixture. Liquid crystal storage mixture II is used for these studies. The cell area is 2 x 2 inches with a liquid crystal thickness of 12.7 microns. The photoconductor is illuminated with a 150-watt continuous xenon source providing $9 \times 10^3$ ergs/cm.$^2$-sec. for incident radiant energy. A line-copy positive transparency is used for imaging. Table II summarizes the electrical response parameters which provide a qualitative index of cell performance.

TABLE II.—ELECTRICAL RESPONSE AND IMAGE QUALITY TEST RESULTS

| Example | Pulse amplitude, volts | Pulse duration, seconds | Image quality[1] |
|---|---|---|---|
| 1 (control) | 450 | [2] 5.0 | 5 |
| 2 (control) | 450 | [2] 9.0 | 2 |
| 3 (control) | 450 | [2] 2.0 | 1 |
| 5 | 300 | 0.4 | 1 |
| 6 | 480 | 1.5 | 1 |
| Organic photoconductive film over-coated with liquid crystal film and having no barrier layer (control) | 200 | 0.4 | 1 |

[1] Image quality rated 1 to 5; 1 is excellent; 5 is poor.
[2] Manually simulated pulse conditions.

The invention has been described in detail with particular reference to preferred embodiments thereof but it will be understood that variations and modifications can be effected within the spirit and scope of the invention.

I claim:

1. In an electro-optical element comprised of a film of a liquid crystal composition, a layer of a photoconductive insulating composition, and a barrier layer separating such film from such composition, the improvement wherein said barrier layer comprises a polymerized blend consisting essentially of about 50 to 100 mole percent of an α,β-ethylenically unsaturated amide, 0 to about 50 mole percent of an α,β-ethylenically unsaturated sulfo ester, and 0 to about 10 mole percent of an acrylic ester containing active methylene groups, said barrier layer having an electrical resistivity greater than that of said liquid crystal composition and less than the dark resistivity of said photoconductive insulating composition.

2. The invention of claim 1 wherein said amide has the formula

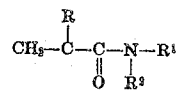

wherein R is selected from the group consisting of hydrogen and a methyl radical and $R^1$ and $R^2$ are selected from the group consisting of hydrogen, a phenyl radical, a naphthyl radical, a lower alkyl radical having 1 to about 6 carbon atoms, a lower alkenyl radical having 1 to about 6 carbon atoms, and substituted phenyl, naphthyl, lower alkyl, and lower alkenyl radicals wherein the substituent is selected from the group consisting of hydroxy radicals, alkoxy radicals having 1 to about 4 carbon atoms, —SO$_3$M and —COOM wherein M is selected from the group consisting of hydrogen, ammonium cations, and metals.

3. The invention as described in claim 1 wherein said sulfo ester has the formula

wherein $R^3$ is selected from the group consisting of a vinyl and α-substituted vinyl radicals; $R^4$ is a divalent organic radical containing 1 to about 10 carbon atoms; and M is selected from the group consisting of hydrogen, ammonium cations, and metals.

4. The invention as defined in claim 1 wherein said polymerized blend consists essentially of said α,β-ethylenically unsaturated amide.

5. The invention as defined in claim 1 wherein said polymerized blend consists essentially of said α,β- ethylenically unsaturated amide and said α,β-ethylenically unsaturated sulfo ester.

6. The invention as defined in claim 1 wherein said barrier layer comprises a colorant in an amount effective to render said barrier layer opaque to visible light.

7. In an electro-optical element comprised of a film of a liquid crystal composition, a layer of a photoconductive insulating composition, and a barrier layer separating such film from such composition, the improvement wherein said barrier layer comprises a polymerized blend consisting essentially of about 50 to 100 mole percent of an α,β-ethylenically unsaturated amide, having the formula

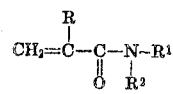

wherein R is selected from the group consisting of hydrogen and a methyl radical and $R^1$ and $R^2$ are selected from the group consisting of hydrogen, a phenyl radical, a naphthyl radical, a lower alkyl radical having 1 to about 6 carbon atoms, a lower alkenyl radical having 1 to about 6 carbon atoms, and substituted phenyl, naphthyl, lower alkyl, and lower alkenyl radicals wherein the substituent is selected from the group consisting of hydroxy radicals, alkoxy radicals having 1 to about 4 carbon atoms.

—SO$_3$M and —COOM wherein M is selected from the group consisting of hydrogen, ammonium cations, and metals; 0 to about 50 mole percent of an α,β-ethylenically unsaturated sulfo ester, said ester having the formula

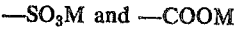

wherein $R^3$ is selected from the group consisting of a vinyl and α-substituted vinyl radicals; $R^4$ is an alkylene radical containing 1 to about 4 carbon atoms; and M is selected from the group consisting of hydrogen, ammonium cations, and metals; and 0 to about 10 mole percent of a compound selected from the group consisting of 2-acetoacetoxyethyl methacrylate, 2-acetoacetoxyethyl acrylate, ethyl α-acetoacetoxymethyl acrylate, and 2-cyanoacetoxyethyl methacrylate, said barrier layer having an electrical resistivity greater than that of said liquid crystal composition and less than the dark resistivity of said photoconductive insulating composition.

8. In an electro-optical device comprised of a film of a liquid crystalline composition, a layer of a photoconductive insulating composition, means for establishing a potential difference between said liquid crystalline composition and said photoconductive composition, and a barrier layer separating such film from such composition, the improvement wherein said barrier layer comprises a polymerized blend consisting essentially of about 50 to 100 mole percent of acrylamides; 0 to about 50 mole percent of an α,β-ethylenically unsaturated sulfo ester having the formula $R^3—CO_2—R^4—SO_3M$ wherein $R^3$ is a vinyl radical or an α-methyl substituted vinyl radical, $R^4$ is a straight-chain alkylene group having 1 to 4 carbon atoms and M is an alkali or alkaline earth metal; and 0 to about 10 mole percent of a compound selected from the group consisting of 2-acetoacetoxyethyl methacrylate and 2-acetoacetoxyethyl acrylate, said barrier layer having an electrical resistivity greater than that of said liquid crystal composition and less than the dark resistivity of said photoconductive insulating composition.

9. The invention of claim 7 wherein said barrier layer comprises a colorant in an amount effective to render said barrier layer opaque to visible light.

References Cited
UNITED STATES PATENTS

| | | | |
|---|---|---|---|
| 3,592,527 | 7/1971 | Conners et al. | 350—160 LC |
| 3,647,280 | 3/1972 | Klein et al. | 350—160 LC |
| 3,652,148 | 3/1972 | Wysochi et al. | 350—160 LC X |
| 3,671,231 | 6/1972 | Haas et al. | 96—1 R |
| 3,687,515 | 8/1972 | Haas et al. | 350—160 LC X |
| 3,707,322 | 12/1972 | Wysochi et al. | 96—1 R X |
| 3,728,008 | 4/1973 | Allan et al. | 350—160 LC |
| 3,634,079 | 1/1972 | Champ et al. | 96—1.5 |
| 3,639,122 | 2/1972 | Shimizu et al. | 96—1.5 X |
| 3,745,005 | 7/1973 | Yoerger et al. | 96—1.5 |
| 3,722,998 | 3/1973 | Morse | 96—44 X |

NORMAN G. TORCHIN, Primary Examiner

J. R. MILLER, Assistant Examiner

U.S. Cl. X.R.

96—1 R; 117—218; 250—213; 350—160 LC, 312

UNITED STATES PATENT OFFICE
CERTIFICATE OF CORRECTION

Patent No. 3,795,517    Dated March 5, 1974

Inventor(s) Richard C. Sutton

It is certified that error appears in the above-identified patent and that said Letters Patent are hereby corrected as shown below:

Column 14, line 5, that portion of the formula reading $CH_2-$   should read   $CH_2=$ Signed and sealed this 9th day of July 1974.

(SEAL)
Attest:

McCOY M. GIBSON, JR.
Attesting Officer

C. MARSHALL DANN
Commissioner of Patents